Nov. 14, 1944.  C. C. FUERST  2,362,546
CAMERA SHUTTER
Filed June 3, 1943  2 Sheets-Sheet 1

CARL C. FUERST
INVENTOR

BY
ATTORNEYS

Nov. 14, 1944.  C. C. FUERST  2,362,546

CAMERA SHUTTER

Filed June 3, 1943  2 Sheets-Sheet 2

CARL C. FUERST
INVENTOR

BY

ATTORNEYS

Patented Nov. 14, 1944

2,362,546

UNITED STATES PATENT OFFICE 2,362,546

CAMERA SHUTTER

Carl C. Fuerst, Rochester, N. Y., assignor to Eastman Kodak Company, Rochester, N. Y., a corporation of New Jersey Application June 3, 1943, Serial No. 489,484

24 Claims. (Cl. 95—63)

This invention relates to photography and, more particularly, to photographic shutters of the type in which a master member is set before an exposure can be made. One object of my invention is to provide a setting type of shutter with mechanism capable of obtaining a high speed of exposure. Another object of my invention is to provide a shutter of the type in which the shutter leaves move in only one direction in opening and closing the exposure aperture. Another object of my invention consists of a shutter including a main set of shutter leaves used for making an exposure and a supplementary set of shutter leaves normally remaining in an open position but closing only during the time the master member is being set. A further object of this invention is to provide a driving mechanism for the shutter blades in which the blades can not only be driven at a high speed but they are also particularly adapted for producing slower speeds. Other objects will appear from the following specification, the novel features being particularly pointed out in the claims at the end thereof.

In my copending application Serial No. 489,485, filed June 3, 1943, for Diaphragm shutter, I have provided a shutter which utilizes the diaphragm leaves which can be totally closed as a cap for preventing light from entering during the setting operation. In the present application a supplementary set of shutter blades are used for the same purpose, the diaphragm being of the usual type for controlling only the amount of light admitted for exposure.

Between-the-lens shutters of known types usually are capable of producing exposures in the order of from 1/200 to 1/400 of a second with shutter blades of the type which swing in one direction to open the blades, and in a reverse direction to close the blades. In the past materially higher speeds were obtained with a shutter known as the "multi-speed" shutter, this shutter employing shutter leaves moving in only one direction and rotating through approximately 360°. It is difficult with the first type of shutter to obtain higher speeds particularly with larger apertures because of the great strain on the thin shutter leaves (which may be approximately .002" in thickness) and because of the difficulty of more rapidly reversing the direction of movement of the shutter leaves. With the second type of shutter mentioned employing rotating leaves, while extremely high speeds could be obtained, a much larger shutter was required to permit each leaf to make a full revolution and, moreover, there was considerable difficulty in producing slow automatic exposures as from $\frac{1}{10}$ to 1 second.

My present invention is particularly directed to overcoming the previous difficulties in that I have provided a structure by which the shutter leaves move in only one direction in making an exposure and in which the leaves move through less than 180°. Since in such a structure the leaves must open and close during the setting movement, I have provided a supplemental set of blades normally open but which will temporarily close the exposure aperture while the shutter is being set. My improved shutter is equipped with a driving mechanism so arranged that the relationship between a series of driving pins carried by the master member and the shutter blade rings can be so altered that, instead of one continuous movement of the blade ring for opening and closing the blades, either such a movement or a movement in which the blade ring is opened, held open and then closed can be produced at will. Thus, I have provided a means of obtaining not only a very high speed, but also very satisfactory slow automatic speeds. To accomplish this, I have also used, in a preferred embodiment of my invention, a pair of blade rings, each blade ring being moved in an opposite direction so that comparatively small blade ring movement is required.

Coming now to the drawings wherein like reference characters denote like parts throughout:

Figure 1:
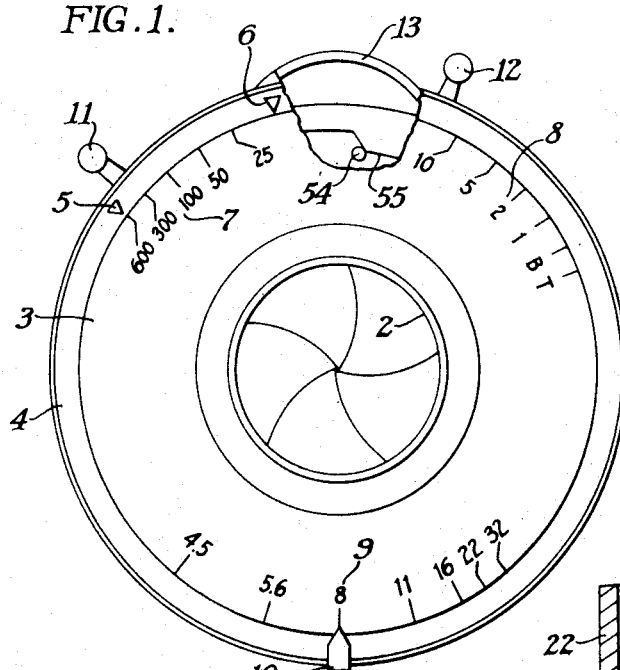
Fig. 1 is a top plan view of a shutter constructed in accordance with and embodying a preferred form of my invention, a portion of the shutter cover being broken away.

A preferred embodiment of my invention may include a shutter casing 1 having an exposure aperture 2 and including a shutter cover 3. This shutter cover may be encircled by a shutter setting ring 4 having a pair of pointers 5 and 6 adapted to indicate on the separated scales 7 and 8 the selected exposure. The shutter shown in Fig. 1 is set for the fastest exposure, here indicated as being 1/600 of a second. The front plate 3 preferably also bears a diaphragm scale 9 over which the pointer 10 indicates the diaphragm opening. The shutter is provided with the usual shutter trigger 11 and the setting lever 12 and I may provide an offset 13 to give a little more room for a master member 14 to move as it swings about its pivot 16 under the influence of a spring 18 anchored at 19 to the shutter plate 20. The setting lever 12 operates through a slot 21 in the upstanding flange 22 of the shutter casing and the trigger 11 may operate through a slot 23 in this flange.

Figure 2A:
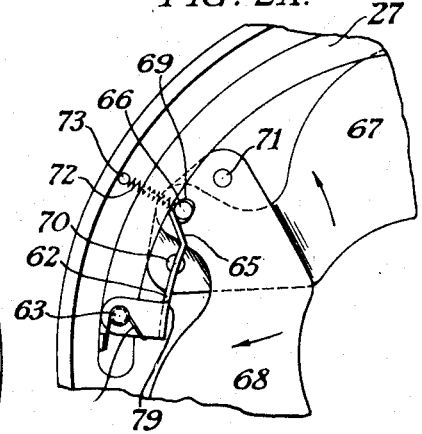
Fig. 2a is a fragmentary detail showing supplementary blade operating mechanism with the blades in their normal or open position.
Figure 2:
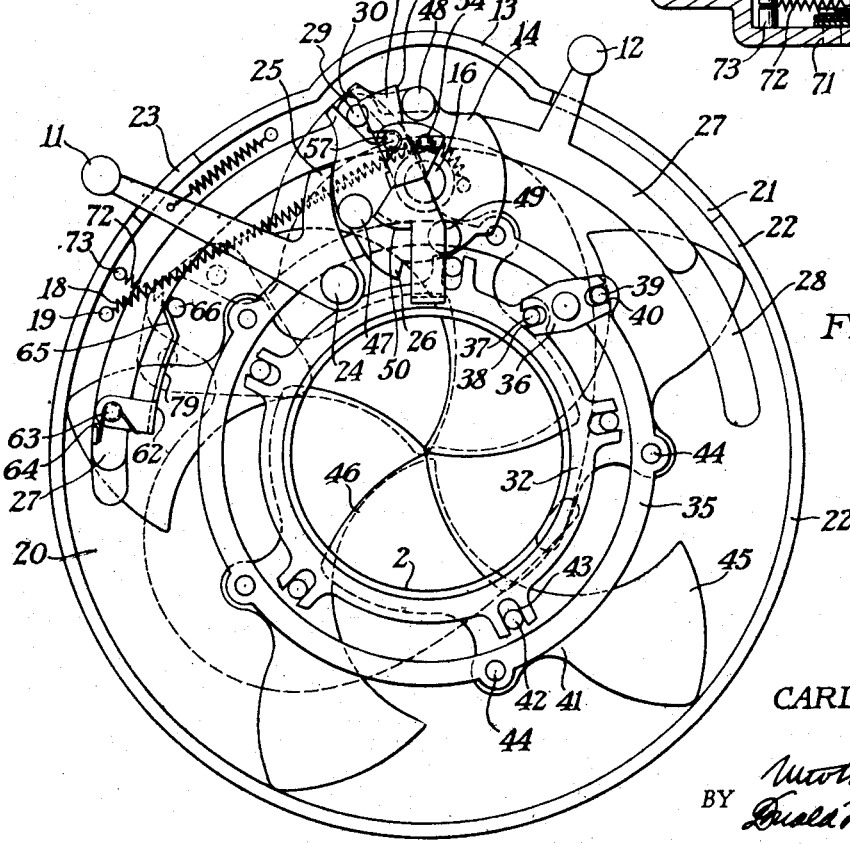
Fig. 2 is an enlarged plan view similar to Fig. 1 but with the shutter cover removed to disclose a portion of the shutter blade operating mechanism.
Figure 4:
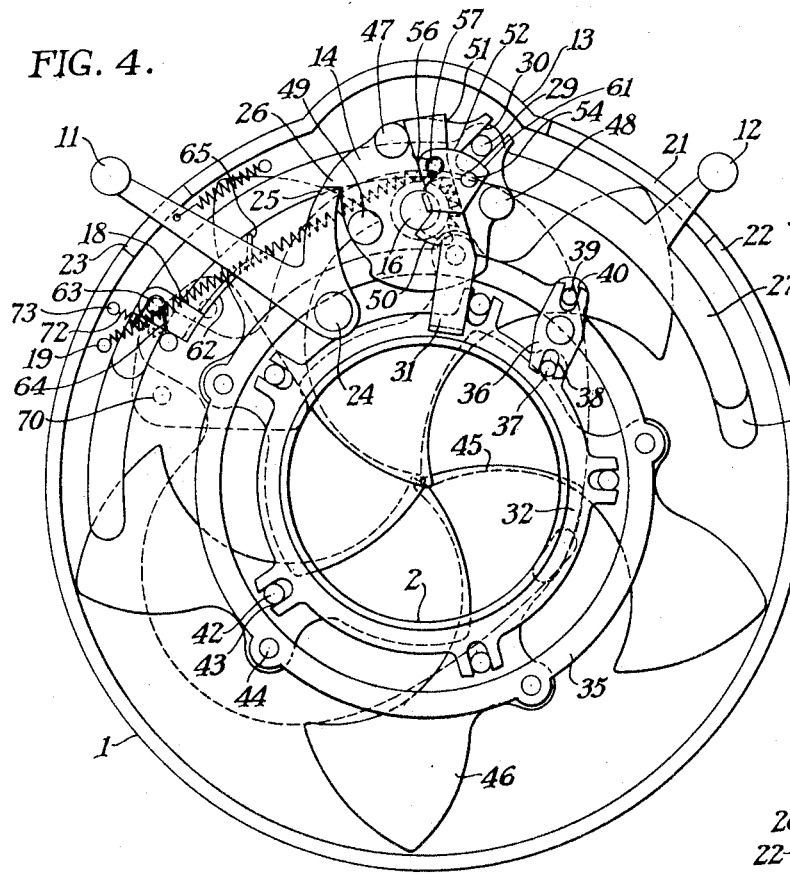
Fig. 4 is a view similar to Fig. 2 but with the shutter blades in a different position (in this figure the shutter is set ready to make an exposure).
Figure 6:
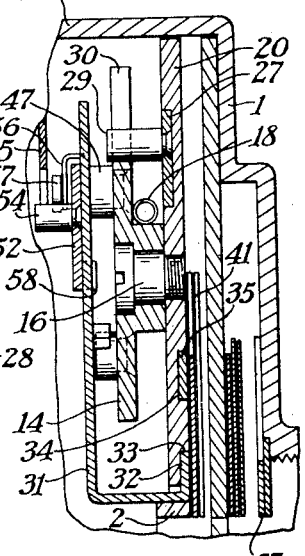
Fig. 6 is a section taken on line 6—6 of Fig. 5.

The trigger 11 is pivoted at 24 to the shutter casing and carries a latch element 25 positioned to engage a latch element 26 on the master member 14, the parts being shown in their set position in Fig. 4 in which the latch elements 25, 26 are in engagement and they are shown in their rest position in Fig. 2 which is the position they assume after an exposure has been made.

The setting lever 12 is carried by an arcuate sliding lever 27 which may ride in a suitable slot 28 in the mechanism plate 20. The arm 27 carries an upstanding pin 29 which engages a slot 30 in the master member 14 so that these two parts move together.

Figure 3:
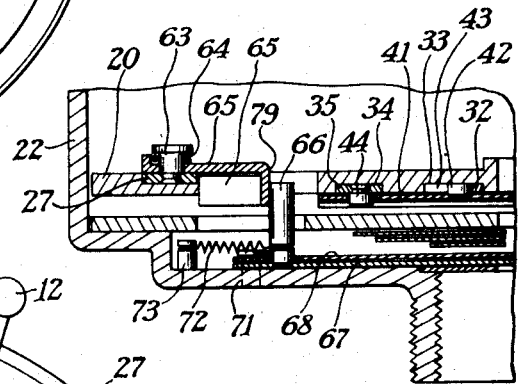
Fig. 3 is an enlarged fragmentary sectional view taken on line 3—3 of Fig. 5.

The master member 14 lies directly under an arm 31 which extends upwardly from a blade ring 32 which, as shown in Fig. 3, is mounted to move in a groove 33 in the mechanism plate 20. A second groove 34 supports a second blade ring 35 so that this ring too may oscillate.

Blade rings 32 and 35 are connected by a rocker arm 36 having a pin 37 and slot 38 connection with the blade ring 32 and a similar pin 39 and slot 40 connection with the blade ring 35. Thus, when the arm 31 moves in a clockwise direction it carries the blade ring 32 with it and the rocker arm 36 moves the blade ring 35 at the same time, in a counter-clockwise direction.

When this movement occurs, the shutter blades 41 are moved through the pins 42 engaging slots 43 in the blade ring 32 and through pins 44 pivotally carrying the shutter blades and being in turn carried by the blade ring 35. Thus, when the blade ring 32 moves clockwise, and the blade ring 35 counter-clockwise, the blades 41 are moved counter-clockwise. Since each blade 41 is symmetrical and includes two portions 45 and 46, either one of which may cover the exposure aperture 2, when the arm 31 is moved in one direction by the master member 14 the arm will cause the shutter to open and close.

Figure 7:
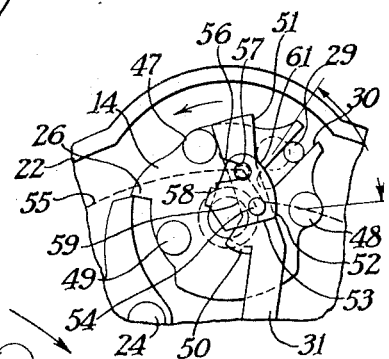
Fig. 7 is a fragmentary detail of a portion of the shutter driving mechanism with the parts positioned for a high speed exposure.
Figure 5:
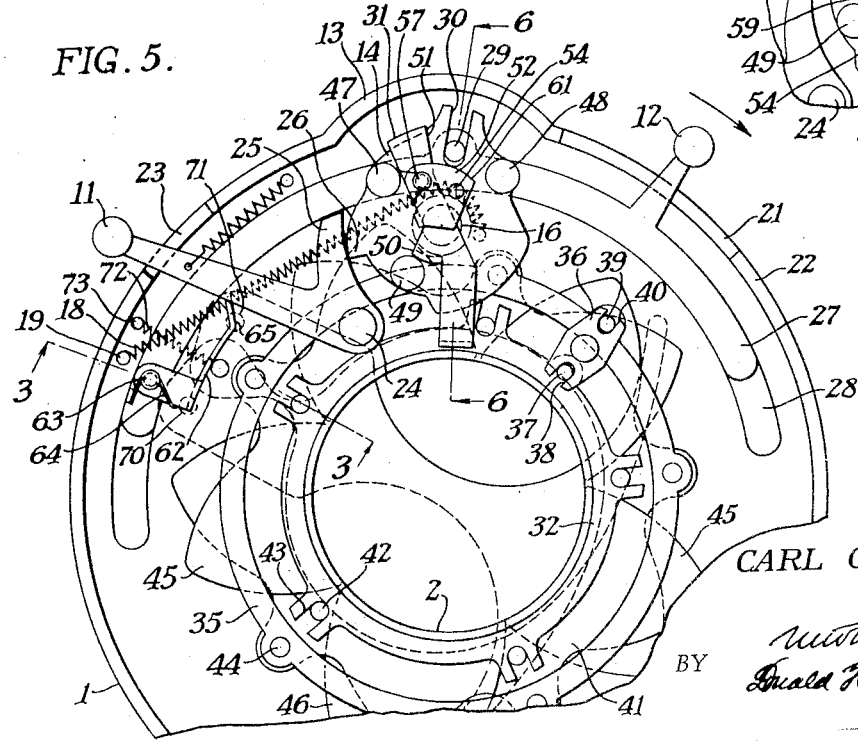
Fig. 5 is a view similar to Fig. 4, portions being broken away and showing the supplementary set of shutter blades.

The mechanism for driving the arm 31 if positioned as shown in Fig. 7 is set for a high speed exposure. The master member carries three pins, a first pin 47 for moving the arm 31 in a clockwise direction to set the shutter, a second pin 48 for moving the arm in a counter-clockwise direction to make an exposure, and a third pin 49 positioned to momentarily hold the shutter arm 31 against movement through engagement with the downwardly extending holding flange 50. When the parts are in their high speed position as in Fig. 7, the holding pin 49 does not perform any function since the downwardly extending holding flange 50 carried by the arm 31 permits the pin 49 to swing idly past and beneath the arm 31 as the master member 14 moves in the direction shown by the arrow. As this movement takes place, the blade ring opening pin 48 moves through a considerable arc as the master member 14 gets up to speed before it strikes the face 51 of the arm 31 turning it rapidly in a clockwise direction. This causes the blade rings 32 and 35 to move the shutter blades from their Fig. 4 or set position to their Fig. 2 or rest position. Since the master member 14 carrying the pin 48 swings a considerable distance before striking the arm 31, it is moving at a high speed when pin 48 meets the face 51 of the arm and consequently the arm is struck a sharp blow which causes it to move rapidly through its path of movement. This enables the shutter to make a very rapid exposure, particularly since two blade rings moving in opposite directions are preferably employed. However, if a slower speed, as for instance 1/25th of a second, is to be made, it is desirable to have the shutter blades open rapidly, remain open as long as possible and close rapidly.

In order to accomplish this, I provide a means on the arm 31 for altering the relationship between this arm and the master member pin 48. This is accomplished by providing an arm extension 52 with a surface 53 which can be swung to and from the path of the pin 48 by means of a pin 54 which may contact with a cam 55 carried by the setting ring 4 as best shown in Fig. 1.

A spring 56 may encircle a pin 57 on which the arm extension is movably mounted. The spring normally holds the arm extension 52 in the position shown in Fig. 4 in which it is in the path of movement of the pin 48. However, the cam 55 may be moved away from and toward the pin 50, and when moved away from the pin 50 it permits the spring 56 to move the arm extension to its slower speed position as indicated in Figs. 2 and 4, which position is determined by the downwardly extending lug 58 engaging the surface 59 of the lever 31. When moved toward pin 50 it cams the pin moving extension 52 to its inoperative or high speed position illustrated in Fig. 7.

When in this position it will be noticed that the pin 48 moves a comparatively short distance before the arm 31 is moved because the arm extension projects into the path of the pin 48 and, consequently, it is almost immediately engaged when the master member starts to move. Since it is necessary to hold the blades open during that interval of time which is determined by the shutter setting ring 4 and a suitable retard mechanism (not shown), the arm holding pin 49 is carried by the master member 14 in such a position that the blade ring arm 31 can only be moved a distance sufficient to open the shutter leaves at which time the pin 49 will strike the downwardly extending flange 50 of the arm 31 and will ride across the curved face of this flange and, as soon as the pin 49 passes the end of the flange and under the lever 31, the pin 48 will continue to move the arm 31. The movement of the master member is continuous, although the arm 31 is momentarily held open by the pin 49 and flange 50. During the time the pin 49 is riding on the flange 50 the pin 48 is crossing the curved upper wall 61 of the arm extension and by the time the pin 49 slips off the flange 50 the pin 48 will have passed about the curved wall 61 of the arm extension so that it may again strike the surface 51 of the arm 31 to continue to drive the blade ring 31 through its final phase of its counter-clockwise movement to close the shutter blades.

Since it is obvious that in setting the shutter by moving the setting lever 12 from its Fig. 2 to its Fig. 4 position the shutter blades 41 must open and close, it is necessary to provide a means for closing the aperture during this setting movement. The setting movement is accomplished by the pin 47 of the master member which strikes the arm 31 moving it in a clockwise direction. When the movement of the setting lever 12 starts, a latch 62 hinged at 63 to the arcuate arm 27 is moved. This latch is normally held by a spring 64 in the position shown in Fig. 2. It includes a beveled arm 65 lying in the path of a pin 66 carried by one supplementary shutter blade 67, the opposite supplementary shutter blade 68 having a slot 69 through which the pin 66 passes. The supplementary shutter blades are carried by pivots 70 and 71 spaced to either side of the pivot 66 so that when this pivot is moved from the position shown in Fig. 2a toward the center of the shutter the blades will close. However, a spring 72 attached to a pin 73 normally hold the blades in an open position.

The beveled arm 65 constitutes a latch pivoted at 63 to the shutter setting arm and normally held by a spring 64 in the position shown with the edge of inclined surface 65 resting against the arcuate arm.

When the arcuate arm is moved by means of the setting handle 12, the arm and the spring latch 65 move in a clockwise direction. The pin 66 is cammed radially of the shutter a distance sufficient to cause the supplementary blades 67 and 68 to swing about their respective pivots 70 and 71 to close the shutter aperture 2. This position is reached when the pin 66 moves over the incline 65. However, since the surface 79 of the latch 65 is concentric with the exposure aperture 2 as long as the pin 66 slides on the surface 65, the blades will remain open. When the handle 12 approaches its fully set position as indicated in Fig. 4, the pin 66 rides off the end of the surface 79 of the latch 62 so that the blades 67 and 68 turn in the direction shown by the arrows in Fig. 2a to reach their normal or open position. By this time the main shutter leaves 41 have opened and closed, through the action of the pin 47 on the master member 14 which carries the arm 27 in a clockwise direction. The relative relation of the latch 65 and the supplementary blades 67 and 68 to the setting lever and master member 14 is such that the supplementary blades close before the shutter blades open and the shutter blades close before the pin 66 slips off the latch 62.

During the exposure, the setting lever 12 and its arcuate arm moves in a counter clockwise direction as the exposure is made. This movement causes the latch 65 to ride past the pin 66 in a counter-clockwise direction as the exposure is made. This movement causes the latch 65 to ride past the pin 66 with the pin lying between the latch and the arcuate arm and when the beveled portion 65 of the latch is reached the pin will cause this latch to snap past the pin 66 as the latch element turns on its pivot 63 under the influence of the spring 64.

The operation of my improved shutter is simple and differs from the usual type of setting shutter in no material respects in so far as the operator is concerned.

Assuming that 1/600th of a second exposure is desired, the shutter setting ring 4 may be turned until the pointer 5 is brought opposite to this graduation on the scale as indicated in Fig. 1. The operator then moves the setting lever 12 in a clockwise direction. The first part of this movement causes the supplementary blades 67 and 68 to immediately close the exposure aperture 2. Continued movement causes the pin 47 to swing the shutter leaves 41 through their respective blade rings 32 and 35 to open and close as the setting pin 47 of the master member 14 engages and moves the arm 31 in the setting operation. This movement of course takes place through the action of the pin 29 in the slot 30. Before the setting lever 12 reaches the fully set position of Fig. 4 and after the supplementary leaves 67 and 68 swing open under the impulse of spring 72, the main shutter leaves 41 have been moved to their Fig. 4 position and slight further movement of the handle 12 causes the trigger latch 25 to snap behind the latch element 26 of the master member. The shutter is now ready for exposure.

Because a high speed exposure has been selected the arm extension 53 is held by the pin 54 and the cam 55 away from its operative position so that the master member pin 48, as best indicated in Fig. 7, may swing quite a distance before striking the surface 51 of arm 31. Consequently this pin reaches a high speed and moves the arm 31 at a high speed in the direction shown by the arrow in Fig. 7. This causes the blades to move rapidly from the Fig. 4 to the Fig. 2 position. The blades move in one direction only and through substantially less than 180°. As in all very rapid exposures with between-the-lens type of shutters, at the highest speed approximately half of the exposure is used in opening the blades and the other half in closing the blades.

If, however, the user had selected a slower speed and one in which the arm extension is permitted to move to its operative position under the influence of spring 56, the opening pin 48 would move a much shorter distance as indicated in Fig. 4 before starting to move the arm 31 so that the arm would be moved a distance to open the shutter blades 44 and then stop the opening movement through the engagement of the holding pin 49 with the flange 50. After the pin 48 slides past the driving surface 53 and about the arcuately curved upper surface 61 of the arm extension, the pin 49 is able to slip off and about the curved face 50 of the downwardly extending flange carried by the arm 31. This movement permits the continued movement of pin 48 to engage the surface 51 of the arm 31 driving the blades to a closed position. In a slow automatic exposure the shutter is considerably more efficient because only a very small part of the time is utilized in opening and closing the shutter blades 41. Thus, if a speed of .001 to .0015 of a second is required for opening and closing the blades the remaining portion of the exposure will be made with the shutter blades fully opened. The exact degree of efficiency of all between-the-lens shutters depends on the exposure time, the time of opening and closing the blades, the time the blades are fully open and, of course, the particular aperture at which the shutter is working. The structure which I have described has proved extremely efficient, except at the highest speeds in which are arm extension is moved away from its operative position, but it is impossible of course to provide a between-the-lens shutter with a higher degree of efficiency at the highest speeds.

I have described a preferred embodiment of my invention but it is obvious that variations of my exact structure can readily be made which will still come within the scope of the appended claims.

I claim:

1. In a camera shutter, the combination with a casing having an aperture therein, of shutter blades movably mounted to open and close said aperture, a blade ring movably mounted for moving the blades to open and close the exposure aperture, a master member, an arm extending from the blade ring across the master member, pins carried by the master member positioned to move the arm in two directions, to make an exposure, and means included in the arm for altering the effective position of the arm relative to a driving pin and consequently the speed of the exposure.

2. In a camera shutter, the combination with a casing having an aperture therein, of shutter blades movably mounted to open and close said aperture, a blade ring movably mounted for moving the blades to open and close the exposure aperture, a master member, an arm extending from the blade ring across the master member, pins carried by the master member positioned to move the arm in two directions to make an exposure, and means comprising a hinged extension movably mounted on the arm for varying the effective position of the arm relative to the master member drive pin.

3. In a camera shutter, the combination with a casing having an aperture therein, of shutter blades movably mounted to open and close said aperture, a blade ring movably mounted for moving the blades to open and close the exposure aperture, a master member, an arm extending from the blade ring across the master member, pins carried by the master member positioned to move the arm in two directions to make an exposure, and means comprising a hinged extension pivotally carried by the lever and movable to and from an operative position for varying the effective position of the arm relative to the master member drive pin, and means for moving the hinged extension.

4. In a camera shutter, the combination with a casing having an aperture therein, of a movably mounted set of blades to open and close said aperture, a master member pivotally mounted to one side of the aperture having pins mounted thereon, a spring tending to turn the master member in one direction, a blade ring connected to each of the set of blades for moving the blades to open and close the aperture, an arm carried by the blade ring and lying in the path of the pins carried by the master member, a movable extension carried by the arm, and means for adjusting the movable extension to and from a position in which it may be engaged by a master member pin.

5. In a camera shutter, the combination with a casing having an aperture therein, of a movably mounted set of blades to open and close said aperture, a master member pivotally mounted to one side of the aperture having pins mounted thereon, a spring tending to turn the master member in one direction, a blade ring connected to each of the set of blades for moving the blades to open and close the aperture, an arm carried by the blade ring and lying in the path of the pins carried by the master member, a movable extension carried by the arm, and means for adjusting the movable extension to and from a position in which it may be engaged by a master member pin, said means comprising a member operable from the outside of the shutter casing.

6. In a camera shutter, the combination with a casing having an aperture therein, of a movably mounted set of blades to open and close said aperture, a master member pivotally mounted to one side of the aperture having pins mounted thereon, a spring tending to turn the master member in one direction, a blade ring connected to each of the set of blades for moving the blades to open and close the aperture, an arm carried by the blade ring and lying in the path of the pins carried by the master member, a movable extension carried by the arm, and means for adjusting the movable extension to and from a position in which it may be engaged by a master member pin for engaging and moving the movable extension when the shutter parts are in either a position of rest or in a set position.

7. In a camera shutter including an apertured casing, the combination with a movably mounted set of blades for opening and closing the aperture, of a blade ring operably connected to each shutter blade, an arm extending from said ring, a master member pivotally mounted under said arm, three arm moving pins carried by the master member, one for moving the lever in setting the shutter, a second for moving the lever in driving the shutter blades open and closed and a third for holding the lever before the shutter blades close.

8. In a camera shutter including an apertured casing, the combination with a movably mounted set of blades for opening and closing the aperture, of a blade ring operably connected to each shutter blade, an arm extending from said ring, a holding flange thereon, a master member pivotally mounted under said arm, three arm moving pins carried by the master member, two located on one side of the arm and one on the other whereby movement of the master member may engage and move the arm through a pin on either side of the arm, the second pin on one side of the arm having a path of movement in which it may engage and momentarily hold the holding flange of said arm against movement.

9. In a camera shutter including an apertured casing, the combination with a movably mounted set of blades for opening and closing the aperture, of a blade ring operably connected to each shutter blade, an arm extending from said ring, a holding flange thereon, a master member pivotally mounted under said arm, three arm engaging pins carried by the master member, one for moving the lever in setting the shutter, a second for moving the lever in driving the shutter blades open and closed, and means for altering the effective distance between the second pin for opening and closing the blades and the arm whereby the relative time of operation of the blades by the master member may be varied for high speed and slow speed exposures, and a third pin for momentarily engaging the holding flange on the arm when the time of operation of the means for altering the effective distance between the second pin and the arm are positioned for slow speed exposures.

10. In a camera shutter including an apertured casing, the combination with a movably mounted set of blades for opening and closing the aperture, of a blade ring operably connected to each shutter blade, an arm extending from said ring, a holding flange thereon, a master member pivotally mounted under said arm, three arm engaging pins carried by the master member, one for moving the lever in setting the shutter, a second for moving the lever in driving the shutter blades open and closed, and means for altering the effective distance between the second pin for opening and closing the blades and the arm comprising an extension pivotally attached to the arm and movable to and from the path of movement of the second pin, a third pin adapted to engage said arm holding flange when said extension is moved into the path of movement of the second pin.

11. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed, and a third for holding the lever before the shutter blades close, the pin for setting the shutter engaging and moving the arm in one direction, the second pin driving the shutter blades open and closed and being so positioned on the master member relative to the arm that the second pin may normally move said arm only after a predetermined travel, and movable means carried by the arm for varying the travel of the second pin before moving the arm.

12. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed and a third for holding the lever before the shutter blades close, the pin for setting the shutter engaging and moving the arm in one direction, the second pin driving the shutter blades open and closed and being so positioned on the master member relative to the arm that the second pin may normally move said arm only after a predetermined travel, and movable means carried by the arm for varying the travel of the second pin before moving the arm, and supplementary blades carried by the shutter casing for closing the aperture while the first pin moves the arm.

13. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed a third for holding the lever before the shutter blades close, the pin for setting the shutter engaging and moving the arm in one direction, the second pin driving the shutter blades open and closed and being so positioned on the master member relative to the arm that the second pin may normally move said arm only after a predetermined travel, and movable means carried by the arm for varying the travel of the second pin before moving the arm, and supplementary blades carried by the shutter casing for closing the aperture while the first pin moves the arm, a setting lever movably mounted on the shutter casing for moving the master member to a set position, and means included in said setting lever for operating the supplementary set of blades.

14. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed and a third for holding the lever before the shutter blades close, the pin for setting the shutter engaging and moving the arm in one direction, the second pin driving the shutter blades open and closed and being so positioned on the master member relative to the arm that the second pin may normally move said arm only after a predetermined travel, and movable means carried by the arm for varying the travel of the second pin before moving the arm, and supplementary blades carried by the shutter casing for closing the aperture while the first pin moves the arm, a setting lever movably mounted on the shutter casing for moving the master member to a set position, and a latch carried by the setting lever for engaging and closing the supplementary blades before the first pin moves the arm, said latch slipping off the supplementary blade after the arm has been fully moved.

15. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed and a third for holding the lever before the shutter blades close, the pin for setting the shutter engaging and moving the arm in one direction, the second pin driving the shutter blades open and closed and being so positioned on the master member relative to the arm that the second pin may normally move said arm only after a predetermined travel, and movable means carried by the arm for varying the travel of the second pin before moving the arm, and supplementary blades carried by the shutter casing for closing the aperture while the first pin moves the arm, a setting lever movably mounted on the shutter casing for moving the master member to a set position, and a latch carried by the setting lever for engaging and closing the supplementary blades before the first pin moves the arm, said latch slipping off the supplementary blade after the arm has been fully moved and a spring engaging and normally holding the supplementary blades in an open position relative to the shutter aperture.

16. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed and a third for holding the lever before the shutter blades close, said lever including a flange extending downwardly from the arm in position to be engaged by the third pin and to slip off the third pin when the master member reaches a predetermined position.

17. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed and a third for holding the lever momentarily before the shutter blades close, said lever including a curved downwardly extending holding flange having a radii of curvature corresponding to the distance from a surface of the third pin to the pivot of the master member, and adapted when said flange curvature is concentric with the master member pivot to engage and be held against movement by said third pin, said curved flange and said third pin lying out of engagement except when the arm is in position for the shutter blades to open the exposure aperture.

18. In a camera shutter including an apertured casing, the combination with a movably mounted set of blades for opening and closing the aperture, of a blade ring operably connected to each shutter blade, an arm extending from said ring, a master member pivotally mounted under said arm, three arm engaging pins carried by the master member, one for moving the lever in setting the shutter, a second for moving the lever in driving the shutter blades open and closed and a third for holding the lever before the shutter blades close, said lever including a curved downwardly extending holding flange having a radii of curvature corresponding to the distance from a surface of the third pin to the pivot of the master member, and adapted when said flange curvature is concentric with the master member pivot and during movement of the master member to engage and momentarily be held against movement by said third pin, and means for varying the relationship of the master member pins to the arm and flange and thereby the extent of holding of the arm by the third pin.

19. In a shutter including an apertured casing, the combination with a movably mounted set of blades for opening and closing the aperture, of a blade ring operably connected to each blade, an arm carried by the blade ring, a setting lever, a master member movable by the setting lever lying under the arm, a spring tending to turn the master member to make an exposure, a blade arm driving pin carried by the master member adapted to drive the arm in one direction, a flange on the blade ring arm, a blade holding pin carried by the master member for holding the blade ring arm through the flange against movement, the shape of the blade ring arm flange and holding pin being such that the holding pin may slip off the flange when the blade ring flange and the holding pin reach predetermined positions.

20. In a shutter including an apertured casing, the combination with a movably mounted set of blades for opening and closing the aperture, of a blade ring operably connected to each blade, an arm carried by the blade ring, a setting lever, a master member movable by the setting lever lying under the arm, a spring tending to turn the master member to make an exposure, a blade arm driving pin carried by the master member adapted to drive the arm in one direction, a flange on the blade ring arm, a blade holding pin carried by the master member for holding the blade ring arm through the flange against movement, the shape of the blade ring arm flange being curved about the center of the master member when the blade ring arm lies approximately over the center of the master member, in which position the holding pin may slip off the flange.

21. In a shutter including an apertured casing, the combination with a movably mounted set of blades for opening and closing the aperture, of a blade ring operably connected to each blade, an arm carried by the blade ring, a setting lever, a master member movable by the setting lever lying under the arm, a spring tending to turn the master member to make an exposure, a blade arm driving pin carried by the master member adapted to drive the arm in one direction, a flange on the blade ring arm, a blade holding pin carried by the master member for holding the blade ring arm through the flange against movement, the shape of the blade ring arm flange being curved about the center of the master member when the blade ring arm lies approximately over the center of the master member, in which position the holding pin may slip off the flange, the height of the holding pin being such that it may engage the flange and pass beneath the blade ring arm.

22. In a shutter including an apertured casing, the combination with a movably mounted set of blades for opening and closing the aperture, of a blade ring operably connected to each blade, an arm carried by the blade ring, a setting lever, a master member movable by the setting lever lying under the arm, a spring tending to turn the master member to make an exposure, two pins extending upwardly from the master member and above the arm, one for moving the arm in one direction in setting the shutter, the other for moving the arm in an opposite direction in making an exposure under the impulse of the master member spring, the position of the two pins relative to the blade ring arm being such that the master member may move a material amount in one direction before a pin is brought into contact with the arm to move the arm, and means carried by the arm for reducing the distance moved by the pin before moving the arm including an arm extension carried by the arm and movable thereon to and from the path of a master member blade ring moving pin.

23. In a shutter including an apertured casing, the combination with a movably mounted set of blades for opening and closing the aperture, of a blade ring operably connected to each blade, an arm carried by the blade ring, a setting lever, a master member movable by the setting lever lying under the arm, a spring tending to turn the master member to make an exposure, two pins extending upwardly from the master member and above the arm, one for moving the arm in one direction in setting the shutter, the other for moving the arm in an opposite direction in making an exposure under the impulse of the master member spring, the position of the two pins relative to the blade ring arm being such that the master member may move a material amount in one direction before a pin is brought into contact with the arm to move the arm, and means carried by the arm for reducing the effective distance moved by the pin before a pin is brought into contact with the arm to move the arm, said means including an arm extension carried by the arm and movable thereon to and from the path of a master member blade ring moving pin, a shutter adjusting member carried by the shutter casing, a protuberance carried by the arm extension, a cam carried by the shutter adjusting member for moving the former to adjust the position of the arm extension on the arm.

24. In a camera shutter including an exposure aperture, the combination with a plurality of shutter blades normally covering the aperture, a blade ring attached to each of the shutter blades to transmit movement thereto, a spring actuated master member, a driving pin carried thereby, and an arm on the blade ring extending into the path of the driving pin for moving the blade ring through a fixed path of movement, means for setting the master member, a trigger for releasing the master member, an arm extension carried by the arm and movable between an inoperative and an operative position thereon for altering the relation of the driving pin and arm, said arm extension having two driving pin engaging surfaces when in an operative position, one positioned to be moved by the driving pin to move the arm a predetermined distance, the other surface being positioned for idle engagement by the driving pin while the arm remains still, said driving pin finally striking the arm after riding over the arm extension surface to move the arm to complete its full path of movement, whereby said shutter blades may open, remain open a period of time and then close.

CARL C. FUERST.